Figure 1:
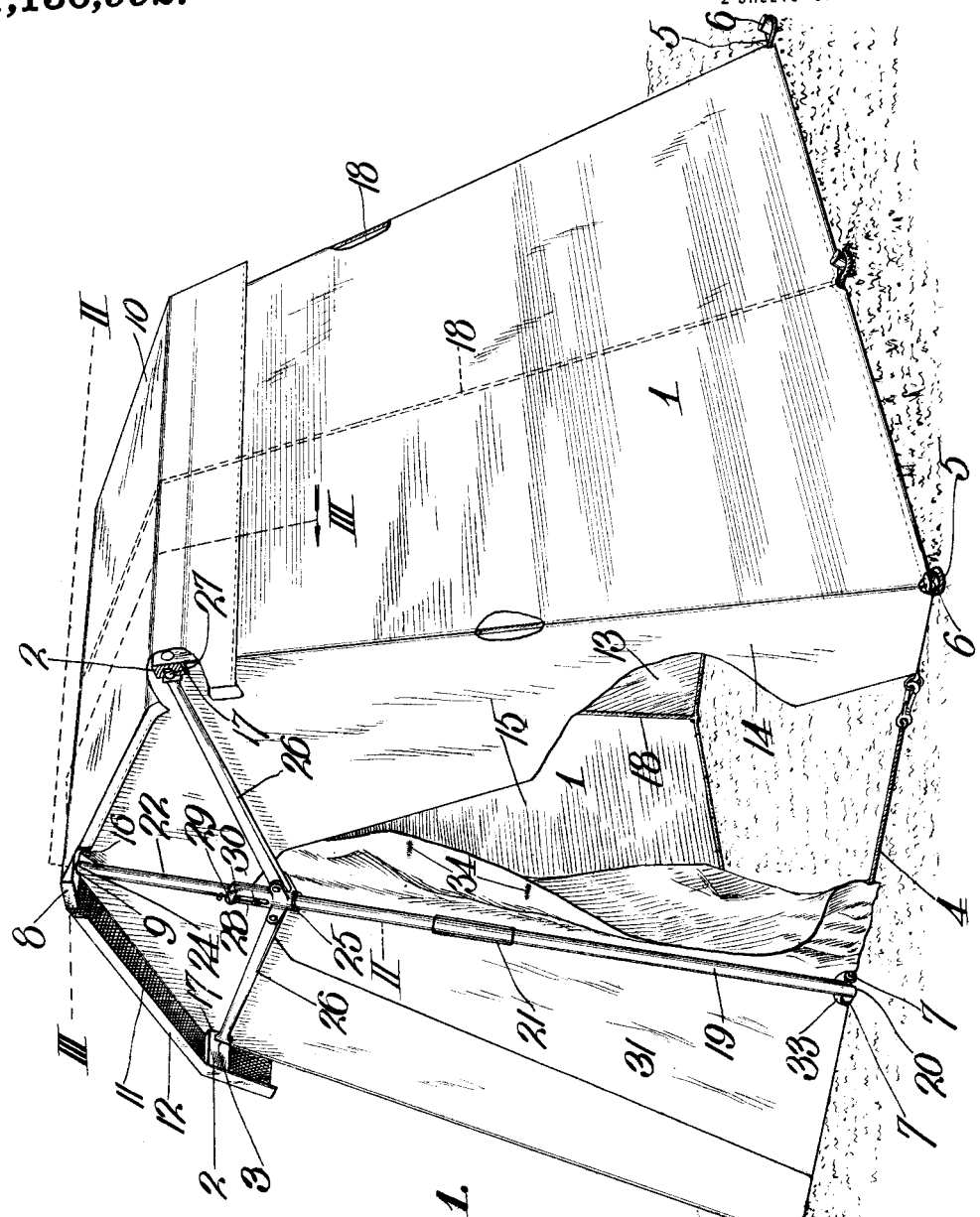

C. M. AVERITT.
TENT.
APPLICATION FILED MAR. 11, 1914.

1,136,992.

Patented Apr. 27, 1915.
2 SHEETS—SHEET 1.

WITNESSES:
Frank R. Glow
H. C. Rodgers

INVENTOR
C. M. Averitt
BY
George Y. Thorpe
ATTORNEY

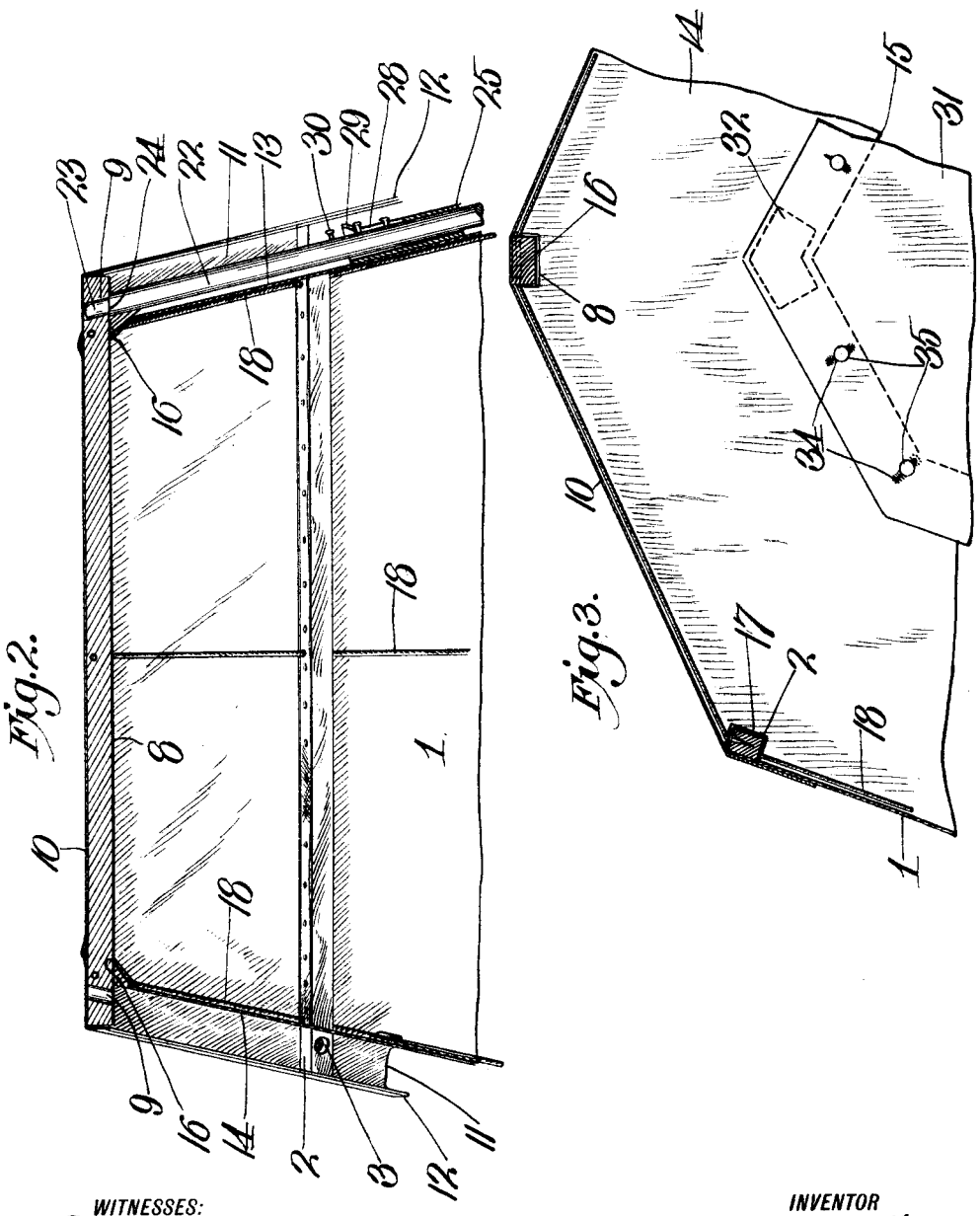

UNITED STATES PATENT OFFICE.

CYRUS M. AVERITT, OF KANSAS CITY, MISSOURI.

TENT.

1,136,992.   Specification of Letters Patent.   Patented Apr. 27, 1915.

Application filed March 11, 1914.   Serial No. 823,907.

*To all whom it may concern:*

Be it known that I, CYRUS M. AVERITT, a citizen of the United States, residing at Kansas City, in the county of Jackson and State of Missouri, have invented certain new and useful Improvements in Tents, of which the following is a specification.

This invention relates to tents and more especially to portable tents for use by campers, hunters and others who usually expect to remain for only a short period at one camp, and my object is to produce a rain-tight tent which combines lightness with strength, durability and cheapness of construction; can be set up or taken down by one person, if necessary; requires no bracing with guy ropes in ordinary weather conditions, and can be folded to small compass for convenience of carriage from place to place.

With these general objects in view the invention consists in certain novel and peculiar features of construction and organization as hereinafter described and claimed, and in order that it may be fully understood reference is to be had to the accompanying drawings, in which—

Figure 1, is a perspective view of a tent embodying my invention. Fig. 2, is a vertical section taken on the line II—II of Fig. 1. Fig. 3, is a section on the line III—III of Fig. 1.

In the said drawings, 1, 1, indicate fabric sides of the tent, the same being fitted around and secured in any suitable manner at their upper edges to a pair of eaves poles 2, which poles in length slightly exceed the width of the sides, so as to project beyond the side margins thereof as shown most clearly in Fig. 2, the projecting ends being formed with sockets 3 in their inner faces. Secured to the lower margins of the sides by being bound therein or otherwise attached thereto is the side portions of a rope 4, which when properly stretched forms a rectangle embodying a front portion and a back portion as well as the two side portions and to said rope may be attached the corners and at the sides thereof loops 5 for engagement with stakes 6 driven in the ground. It will be seen that the rope when stretched taut forms a gage to determine where to drive the stakes, and near the middle of the front and back portions of the rope, pairs of collars or enlargements 7 are formed for a purpose which hereinafter appears. Arranged centrally with respect to the eaves poles 2, but considerably higher than the same, is a ridge pole 8, the same being somewhat larger than the eaves poles and having openings or sockets 9 near its extremities.

10 is the fabric top of the tent, the same being preferably of waterproof material and of length to stretch from the outer side of one eaves pole over the ridge pole and to and beyond the other eaves pole, and said top is secured to the poles in any suitable or preferred manner. It is of width to project slightly beyond the extremities of all of the poles so as to form what may be termed eaves 11 and protects the said poles to a considerable extent from rain, by sagging downward at its side margins at the ends of the poles, as indicated at 12.

13 and 14 respectively indicate the back and front walls of the tent, the same being of fabric and the front wall having a door opening 15. Said walls preferably occupy upwardly converging positions and substantially parallel the planes in which lie the adjacent extremities of the poles, as shown clearly by reference to Fig. 2. Said walls occupy planes coinciding with the side margins of the side walls 1 and hence are provided with an opening 16 for the reception of the ridge pole and openings 17 for the reception of the eaves poles as shown most clearly in Fig. 3 or said front and back walls may be otherwise attached to said poles and incidentally to the top 10 inward of the side margins thereof by stitching, not shown, or in any other suitable manner. It will thus be seen that the points where the front and back walls meet the top and the poles are protected by the eaves 11 and the depending marginal flanges 12 thereof so that seldom, if ever, will rain enter the tent by leakage or otherwise at said points. In this connection it is desirable to state that the sides and front and back walls may be cut from a single piece of fabric or be composed of pieces stitched together, or otherwise secured, and in this connection it is also desirable to state that the top may be integral with the sides and be stitched to the ends, in which event the eaves 11 and 12 will be omitted unless separately attached, it being further understood that however made, the top, sides and ends will be permanently attached together, in the preferred construction.

To relieve the fabric of strain and to give it the required shape without undesirable sagging at the corners or at the sides between the front and rear corners, and to prevent undue sagging of the roof or top portion of the tent, the same is provided with an interior skeleton frame, consisting of three ropes 18 which follow the lines of the sides and top, two of the ropes coinciding with the corners of the tent and the top where the same joins the front and rear walls, and the third rope occupying a position between the two corner ropes. Each rope is attached at its middle in any suitable manner to the ridge pole and eaves poles and at its lower ends to the rectangularly arranged rope 4 at the junction thereof with the ropes 5—in fact the preferred construction is to fasten the said frame ropes to the rope 4 near their ends and then form the extremities into loops for engagement with the stakes 6.

For stretching and holding the tent in conjunction with the top frame consisting of ropes 4 and 18 and the stakes, I provide a pair of poles and stretchers as follows:— Each pole consists of a lower section 19, having a forked lower end 20 to fit over the adjacent portion of the rope 4, between the collars or enlargements 7 thereof; a sleeve 21 secured upon the upper end of the lower section and projecting above the same to provide a socket, and an upper section 22 to fit at its lower end in said socket and reduced at its upper end to form a tenon 23 to enter one of the openings or sockets 9 in the ridge pole 8, the reduction of the end of the pole incidentally providing an upwardly disposed shoulder 24 to engage the underside of the ridge pole and form a support for the same. Each stretcher is in the form of a toggle, consisting essentially of a sleeve 25 fitting slidingly on one of the poles above the joint thereof, and a pair of arms 26 pivoted to said sleeve and extending divergingly upward therefrom and terminating in tenons 27 engaging the sockets 3 in the inner sides of the eaves poles 2. The stretcher is caused to perform its stretching function by upward movement of the sleeve on the pole whereby the toggle is expanded, and the preferred means for securing the toggle in expanded condition,—at which time it will be understood the tent is properly stretched,—is to provide the sleeves with longitudinal slots 28 and with flared upper ends 29, these flared ends enabling the sleeves to slide readily over pins 30 of a longitudinal series projecting from the poles in the plane of said slots, it being understood that the sleeves will be loose enough upon the poles to provide for sufficient lateral play to permit of overriding the pins as explained.

As a closure for the door opening 15, I provide a fabric door, 31 which is bound at its lower edge upon the rope 4 so as to be capable of sliding thereon and it is of substantially the same contour as but larger than the opening 15 so that when fully stretched out it shall lap the front wall around the opening at the inner side of said wall. The door will preferably be attached permanently at its apex to the front wall as by stitching at 32 so as to prevent it falling down without preventing it from being slid toward the center until bunched in a vertical column against the adjacent pole, it being obvious that either or both of said sides may be drawn back so as to expose half or substantially the entire door opening, it being noted that for the accommodation of the lower ends of the poles where they engage the front and rear portions of the rope between the collars or enlargements 7 thereof, the door and the back wall must be cut away as at 33.

I claim:

1. A tent, comprising a pair of upright supporting poles, a ridge pole connecting and secured to the upper ends of the supporting poles, a pair of eaves poles paralleling the ridge pole and located at opposite sides of the same, a top stretched over and secured to said ridge and eaves poles, side walls extending down from the eaves poles, front and back walls connecting the front and rear edges respectively of the side walls and secured to the said ridge and eaves poles inward of the ends of the same and of the supporting poles and the front and rear ends of the top, said top, side walls and end walls being of fabric, toggle connections between the supporting poles and the ends of the eaves poles externally of the front and back walls, and means for anchoring the walls to the ground.

2. A tent comprising a pair of upright supporting poles, a ridge pole connecting and secured to the upper ends of the supporting poles, a pair of eaves poles paralleling the ridge pole and located at opposite sides of the same, a top stretched over and secured to the said ridge and eaves poles, side walls extending down from the eaves poles, front and back walls connecting the front and rear edges respectively of the side walls and secured to the said ridge and eaves poles inward of the ends of the same and of the supporting poles and the front and rear ends of the top, said top, side walls and end walls being of fabric, toggle connections between the supporting poles and the ends of the eaves poles externally of the front and back walls, a flexible reinforcement for the lower edges of the walls, and means for anchoring the walls to the ground.

3. A tent comprising a pair of upright supporting poles, a ridge pole connecting and secured to the upper ends of the supporting poles, a pair of eaves poles paralleling the ridge pole and located at opposite sides of the same, a top stretched over and secured to said ridge and eaves poles, side walls extending down from the eaves poles, front and back walls connecting the front and rear edges respectively of the side walls and secured to the ridge and eaves poles inward of the ends of the same and of the supporting poles and the front and rear ends of the top, said top, side walls, and end walls being of fabric, toggle connections between the supporting poles and the ends of the eaves poles externally of the front and back walls, a flexible reinforcement of the lower edges of the walls, provided midway the width of the front and back walls with a pair of enlargements flanking the lower ends of the supporting poles to prevent lateral movement thereof, and means for anchoring the walls to the ground.

4. A tent, comprising a pair of upright supporting poles, a ridge pole connecting and secured to the upper ends of the supporting poles, a pair of eaves poles paralleling the ridge pole and located at opposite sides of the same, a top stretched over and secured to the said ridge and eaves poles, side walls extending down from the eaves poles, front and back walls connecting the front and rear edges respectively of the side walls and secured to the said ridge and eaves poles inward of the ends of the same and of the supporting poles and the front and rear ends of the top, said top, side walls and end walls being of fabric, toggle connections between the supporting poles and the ends of the eaves poles externally of the front and back walls, a flexible reinforcement for the lower edges of the walls, cords secured to the ridge and eaves poles and extending down from the latter along and under the corners formed by the front and side walls and attached at their lower ends to the said flexible reinforcement, and means for anchoring the walls to the ground.

5. A tent, comprising a pair of upright supporting poles, a ridge pole connecting and secured to the upper ends of the supporting poles, a pair of eaves poles paralleling the ridge pole and located at opposite sides of the same, a top stretched over and secured to the said ridge and eaves poles, side walls extending down from the eaves poles, front and back walls connecting the front and rear edges respectively of the side walls and secured to the said ridge and eaves poles inward of the ends of the same and of the supporting poles and the front and rear ends of the top, said top, side walls and end walls being of fabric, and the front wall having a door opening, toggle connections between the supporting poles and the ends of the eaves poles externally of the front and back walls, a flexible reinforcement for the lower edges of the walls, an inverted-V shaped fabric door secured at its apex to the front wall above the door opening therein and slidingly affixed at its lower end to the said flexible connection at opposite sides of the front supporting pole, and means for anchoring the walls to the ground.

In testimony whereof, I affix my signature in the presence of two witnesses.

CYRUS M. AVERITT.

Witnesses:
FRANK R. GLORE,
G. Y. THORPE.

Copies of this patent may be obtained for five cents each, by addressing the "Commissioner of Patents, Washington, D. C."